United States Patent
Shashidhar et al.

(10) Patent No.: US 7,545,876 B2
(45) Date of Patent: Jun. 9, 2009

(54) METHOD FOR LINK ADAPTATION

(76) Inventors: Vummintala Shashidhar, 3930 Freedom Cir., #101, Santa Clara, CA (US) 95054; Vara J. Prasad, 3930 Freedom Cir., #101, Santa Clara, CA (US) 65054; Ozgur Oyman, 1470 Sand Hill Rd., #311, Palo Alto, CA (US) 94304; Erik Lindskog, 3930 Freedom Cir., #101, Santa Clara, CA (US) 95054; Robert Lorenz, 3930 Freedom Cir., #101, Santa Clara, CA (US) 95054; Kamlesh Rath, 3930 Freedom Cir., #101, Santa Clara, CA (US) 95054

( * ) Notice: Subject to any disclaimer, the term of this patent is extended or adjusted under 35 U.S.C. 154(b) by 601 days.

(21) Appl. No.: 11/355,293

(22) Filed: Feb. 14, 2006

(65) Prior Publication Data
US 2006/0182196 A1 Aug. 17, 2006

(30) Foreign Application Priority Data
Feb. 16, 2005 (IN) .................... 169/MUM/2005

(51) Int. Cl.
H04B 7/02 (2006.01)

(52) U.S. Cl. ..................... 375/267; 455/102
(58) Field of Classification Search ........... 375/267; 455/102
See application file for complete search history.

(56) References Cited

U.S. PATENT DOCUMENTS

2006/0105767 A1* 5/2006 Kim ............... 455/434

OTHER PUBLICATIONS

U.S. Appl. No. 60/588,630.*

* cited by examiner

*Primary Examiner*—David C Payne
*Assistant Examiner*—Tanmay K Shah

(57) ABSTRACT

Systems and methods for optimizing transmission of a plurality of data streams on a multiple-input multiple-output channel are described. The systems and methods for optimizing reduce the multiple-input multiple-output channel for each transmission scheme to an equivalent single-input single-output channel for the transmission scheme and transmit the plurality of data streams based on the single-input single-output channel for the transmission scheme. Systems and methods for optimizing the transfer of data for any number of transmit and receive antennas are described.

19 Claims, 5 Drawing Sheets

US 7,545,876 B2

METHOD FOR LINK ADAPTATION

RELATED APPLICATION DATA

This application claims priority to and incorporates by reference India application serial number 169/MUM/2005 filed on Feb. 16, 2005, titled Link Adaptation Technique for Multiple Transmit Multiple Receive Antenna Wireless Systems.

FIELD OF THE INVENTION

The invention relates generally to the field of wireless communication networks. In particular, the invention relates to a method for performing a link adaptation to optimize transmission of data on a multiple-input-multiple-output (MIMO) channel independent of the number of transmitters and receivers.

BACKGROUND OF THE INVENTION

With the progress of technology, electronic devices are becoming increasingly advanced and capable of performing a variety of tasks. Users of electronic devices such as mobile phones, laptops, PDAs etc. are always on the move and wireless communication is exceedingly important for the mobile professional. Users want to be connected to other people, send and receive emails, browse the internet and perform several other functions while on the move.

To perform the functions stated above, the amount of data that needs to be transmitted from a transmitting station with multiple transmitting antennas to receiving stations is ever increasing. In wireless communications, the performance of a system (i.e. the rate of transmission, the error rates, etc.) is dependent on the quality of the transmission channel. The quality of the transmission channel changes constantly and therefore wireless communications systems provide services for varying data rates to allow for these changing transmission conditions.

For this purpose a process called link adaptation is carried out where based on the feedback received from the receiving station, different transmission schemes can be implemented. For example, schemes that support faster transmission can be implemented when the channel conditions are relatively good and slower transmission schemes with greater redundancy can be used when the channel characteristics are relatively poor. However, this link adaptation needs to be done on an ongoing basis to determine the characteristics of the channel, in order to enable the best modes of transmission.

Conventional systems used only two transmit and two receive antennas. However, with the growing demand of higher and more reliable data rates, multiple-input-multiple-output systems that support multiple transmit antennas and multiple receive antennas are being developed. The process of performing link adaptation for any number of transmit antennas connected to any number of receive antennas is currently not known. Alamouti and Pure Spatial Multiplexing are one of the few transmission schemes that optimize data transmission in two transmit and two receive antenna networks.

Thus there is a need to generalize the process of link adaptation for any number of transmit and receive antennas that provide ways of determining the most efficient data transmission schemes.

DETAILED DESCRIPTION OF THE INVENTION

Figure 1:
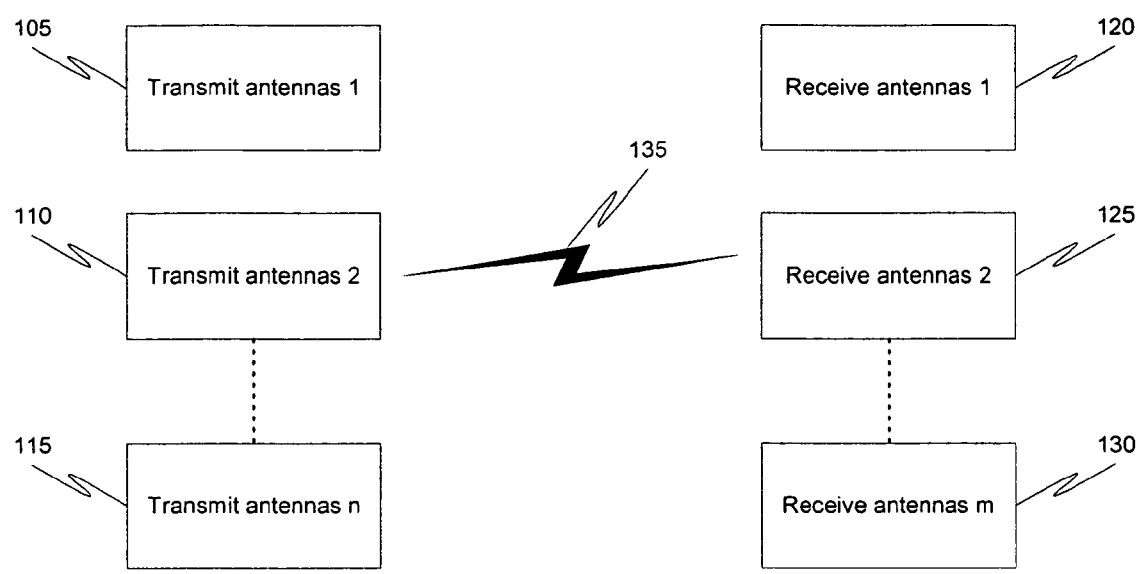
FIG. 1 shows a block diagram of an embodiment of the invention showing transmitters and receivers in a wireless communication network.

The systems and methods described below may be embodied in several forms and manners. The description provided below and the drawings show example embodiments of the invention. Those of skill in the art will appreciate that the invention may be embodied in other forms and manners not shown below. The invention shall have the full scope of the claims and is not to be limited by the embodiments described and/or shown herein.

The present invention pertains to a link adaptation technique in wireless communication networks. Typically in wireless transmission of data by a radio unit, the data received by the receiver antennas is often modified from the original data due to the disturbance and noise present in the transmission channel. The data, combined with the noise present in the channel, is obtained at the receiving end. Previously single-input-single-output (SISO) or multiple-input-single-output (MISO) channels were used to transmit data. The technique of using multiple-input-multiple-output (MIMO) channels that increases the number of antennas to transmit and receive data provides improved quality of transmission in wireless channels.

The use of MIMO channels allows a host communication system to approach performance limits and to exploit efficient and practical coding, modulation and space-time coding schemes for wireless links using multiple transmit and receive antennas. For this reason, link adaptation is described below for use at the receiving end where a link adaptation module, comprising signal processing hardware and/or software, performs computations to determine the best mode of data transmission.

The process of link adaptation changes the mode of transmission (e.g., changes the modulation order, the coding rate and/or other signal transmission parameters) based on the knowledge of transmission channel characteristics. The process of link adaptation allows for increases in data rate and spectral efficiency of the transmission channel or communication link. The link adaptation enables data to be transmitted optimally (e.g., with maximum throughput or least error rate) by considering that for a given average signal-to-noise ratio (SNR), the instantaneous SNR could be varying. The instantaneous SNR can vary between being more than the average SNR to being less than the average SNR. This causes the resulting packet error rate (PER) or bit error rate (BER) to vary depending on the instantaneous SNR. Thus, by calculating the instantaneous SNR at every transmission, the link adaptation of an embodiment adjusts the transmission scheme at the transmitter so that the PER at the receiver is maintained or even reduced.

In an embodiment, link adaptation on a MIMO channel includes reducing the multiple-input multiple-output channel matrix for each transmission scheme to an equivalent single-input single-output channel matrix for the transmission scheme such that the single-input single-output channel matrix for the transmission scheme is a linear system of equations that can be solved to determine the best mode of transmitting the data.

FIG. 1 shows a wireless communications channel 135 with multiple transmitters 105, 110, 115 and multiple receivers 120, 125, 130 to which link adaptation can be applied, under an embodiment. The receivers 120, 125, 130 may comprise, for example, a wireless computer, wireless laptop or a hand held device, such as a mobile phone or a personal digital assistant (PDA). The receivers 120, 125, 130 may receive a video feed or an audio feed data or any other form of data from the transmitters. The transmitters 105, 110, 115 can be mobile towers or radio towers or the like which transmits the data over a wireless channel. The data needs to be mapped onto a signal for transmission to the receivers 120, 125, 130 that is interpreted on each receiver and the original data is retrieved.

The transmitted data often changes substantially while being transmitted in the channel due to the presence of noise and other forms of interference to which the signal is subjected. The receiving end receives the modified data, which comprises the noise. For efficient transmission, the data needs to be adapted for the channel and the necessary error correction mechanisms such as adding more redundancy, decreasing the data transmission rate need to be implemented.

Figure 2:
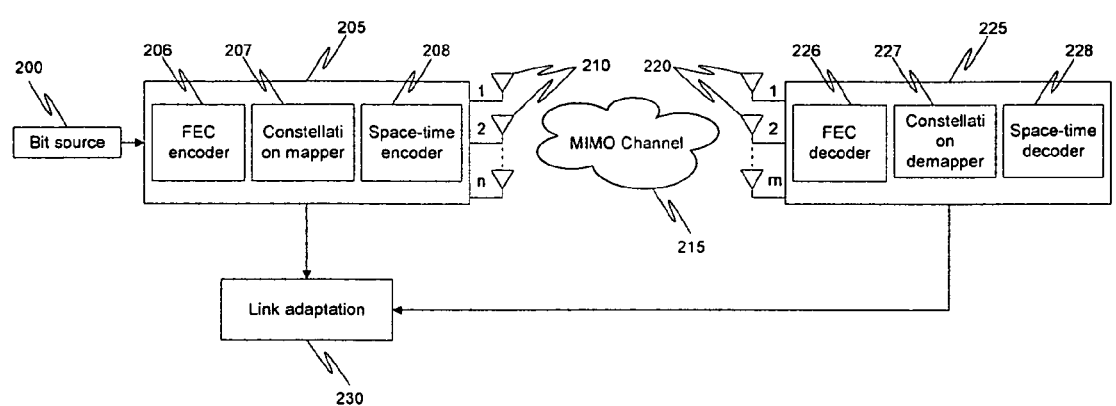
FIG. 2 shows a block diagram for link adaptation on a multiple-input multiple-output channel, under an embodiment.

FIG. 2 shows link adaptation on a multiple-input multiple-output channel 215, under an embodiment. The transmitting end 205 receives an input in the form of bits 200 for transmission. The transmitting end 205 comprises a forward error correction (FEC) encoder 206, a constellation mapper 207 and a space-time encoder 208 that are used to optimize the transmission of data over time and space. Conventional systems did not use over two transmitters and two receivers and hence the need to optimize transmission over space was not felt. However, with the need to transmit data at high rates, multiple transmit antennas 210 and multiple receive antennas 220 are being used. The optimization process of an embodiment uses the FEC encoder 206 and the constellation mapper 207 to optimize data transmission over time, while using space-time encoder 208 to optimize the transmission over space.

The encoded data is sent via the MIMO channel 215 to the plurality of receive antennas 220. In one embodiment, each receiver 225 is equipped with an FEC decoder 226, a constellation demapper 227 and a space-time decoder 228. The receiver 225 decodes the transmitted data which involves removing the noise, other interference etc. and provides feedback information to the transmitting end 205. The link adaptation module 230 at the transmitting end 205 uses the received feedback information to evaluate the MIMO channel 215 and performs link adaptation to determine the best transmission scheme for the data.

There are several modes of transmission available for use over the MIMO channel including modes that provide greater throughput, and modes that provide for greater error correction due to redundancy. To determine the best mode of transmission, the systems and methods of an embodiment calculate or determine channel gain for each transmission scheme and, based on this channel gain and the feedback provided, select a particular transmission scheme. In an embodiment, each of the transmission modes is a three-tuple of an FEC gain, a modulation gain and a space-time coding gain but the embodiment is not so limited. The space-time coding gain is computed by generally reducing the multiple-input multiple-output channel matrix for each transmission scheme to an equivalent single-input single-output channel for the transmission scheme and then transmitting the data based on the single-input single-output channel matrix for the transmission scheme.

In a SISO communication system, the PER or BER performance depends on the instantaneous received SNR. The received SNR is just the signal fade coefficients multiplied by the transmitted power and is used to compute the SNR. Based on the computed SNR, a transmission scheme that satisfies the requirements of the PER or throughput using a precomputed look-up table is chosen. Previous methods provided ways to determine the SNR for some specific cases in MIMO transmissions such as MIMO systems employing space-time codes from orthogonal designs. However, an embodiment of the present invention provides a method to determine the SNR for all forms of MIMO transmission schemes.

Figure 3:
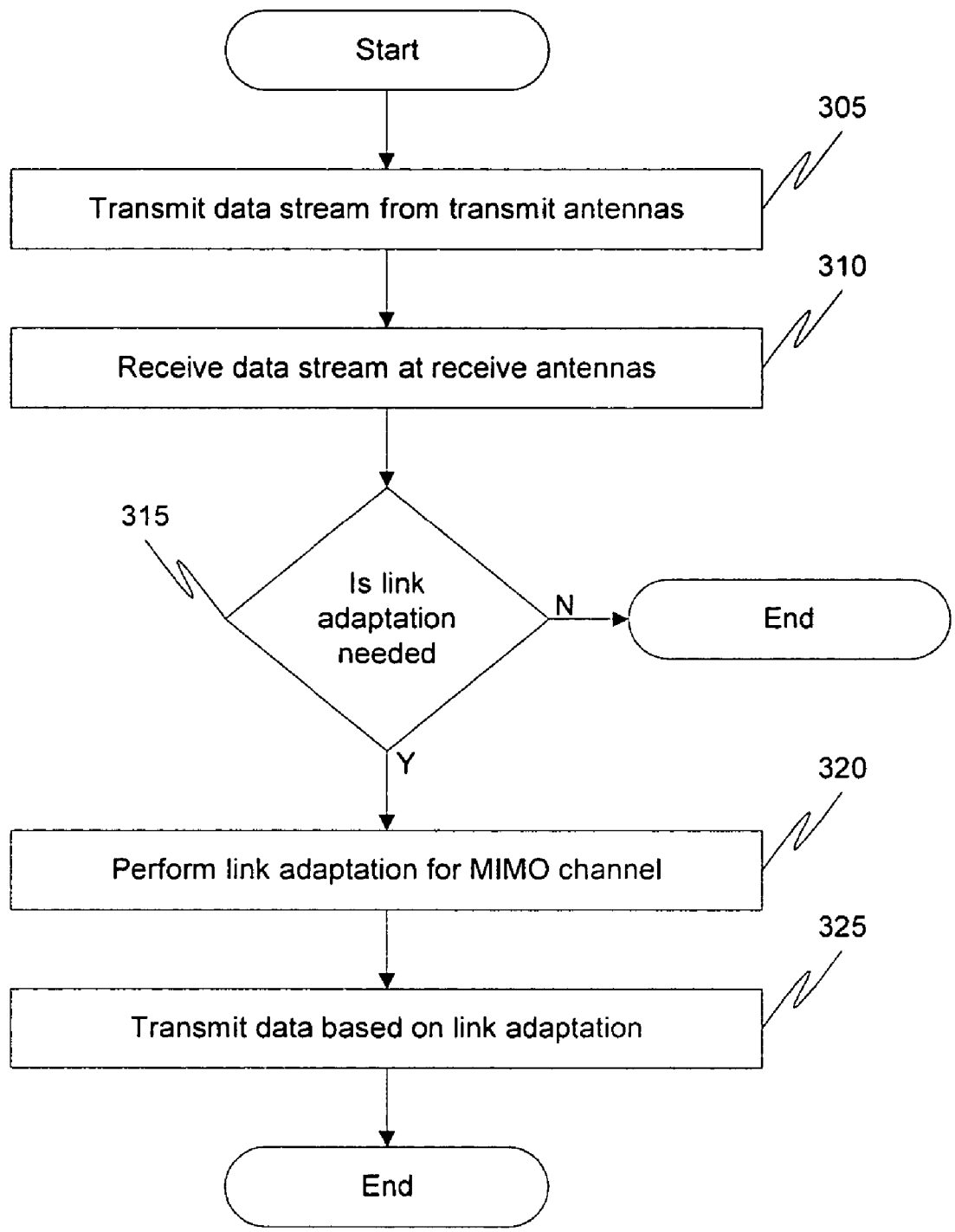
FIG. 3 shows a flow diagram for receiving the transmitted data from the transmitter.

FIG. 3 is a flow diagram for transmitting and receiving data, under an embodiment. The transmitter of an embodiment receives a bit source in the form of a data stream for transmission over a wireless communications channel to a plurality of receivers. For example, a video feed requested by several mobile phones in a particular area may be provided for transmission from the base station to the receiving antennas of the mobile phones. The video feed data is mapped to a signal for transmission using the transmitting antennas. At 305, the received data stream is encoded (e.g., using the FEC encoder), modulated and transmitted to the plurality of receivers. The receiving antennas or other components of the target devices receive the data stream and decode the data, at 310. Information of this decoded data is sent as feedback to the transmitters for use in determining the amount of change introduced into the transmitted data as a result of the noise and other interference of the channel.

One or more components (e.g., link adaptation module) at the transmitting end determine 315 using the received feedback the amount of change in the original transmitted data. If the data has undergone substantial change, for example, if the data at the receiving end indicates more than half the transmitted bits have changed, link adaptation is performed 320 based on the data and channel characteristics. In one embodiment, this may cause a delay of one frame for an entity such as a user moving at approximately 30 km/hour, but the embodiment is not so limited. The data is then transmitted based on the optimal transmission scheme.

Figure 4:
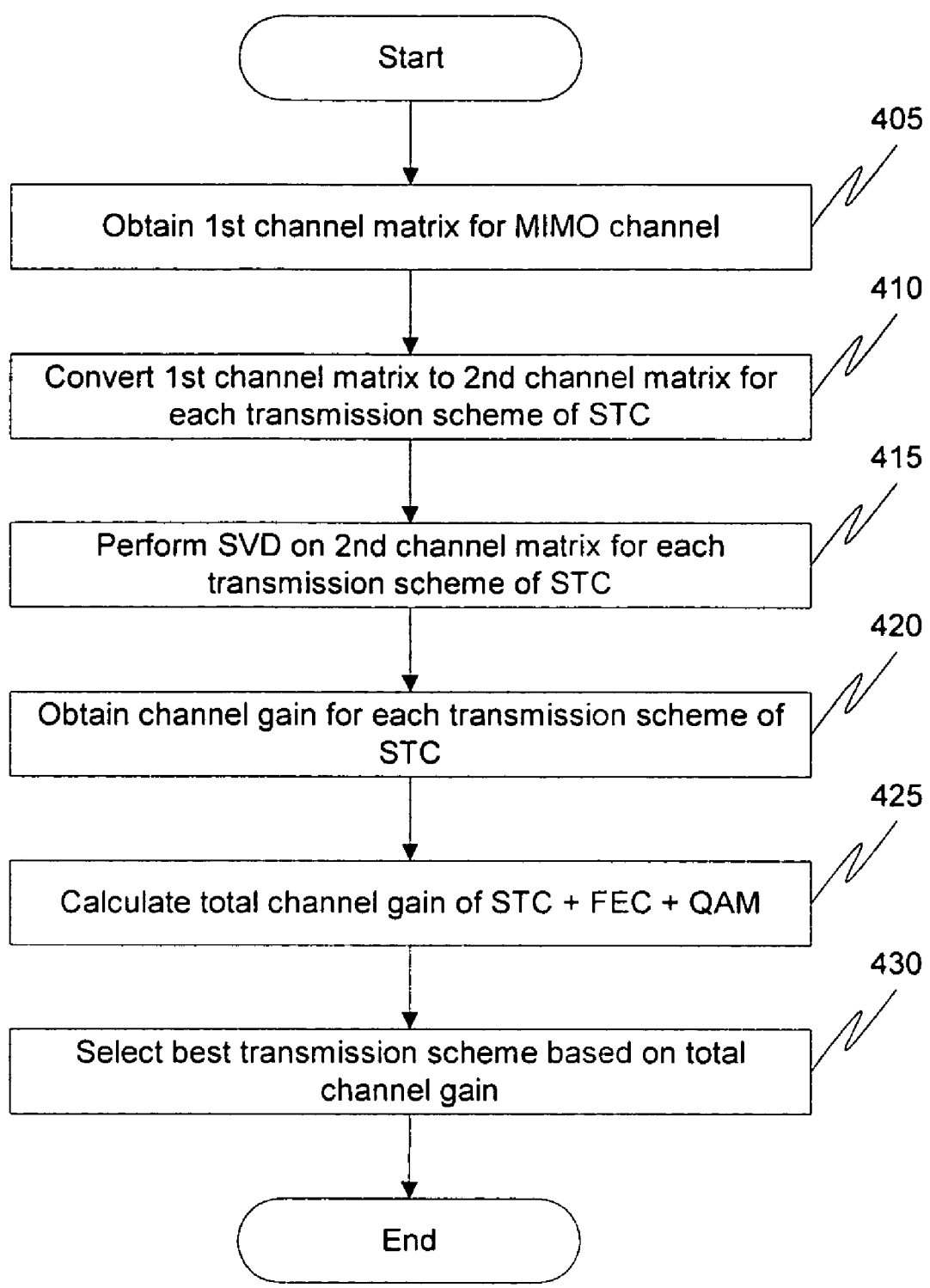
FIG. 4 shows a flow diagram for link adaptation, under an embodiment.

FIG. 4 is a flowchart for calculating the SNR for the MIMO schemes and selecting a transmission scheme, under an embodiment. This dynamic link adaptation provides optimized data transmission for which the error rate at the receiving end is reduced or is maintained constant in spite of any change in the channel characteristics. In one embodiment, the link adaptation process comprises reducing the multiple-input multiple-output channel matrix for each transmission scheme to an equivalent single-input single-output channel matrix. The data is then transmitted over the channel based on the optimum transmission scheme computed using the single-input single-output channel matrix. The link adaptation first computes a channel gain for each transmission scheme of the space-time coding schemes available and uses this channel gain as a reference for optimizing the FEC gain and the Quadrature Amplitude Multiplexing (QAM) gain. An embodiment of the space-time coding gain computations is described below.

In an embodiment, in order to optimize the data transmission on a MIMO channel, a first channel matrix corresponding to the MIMO channel is computed, at 405. For example, let $M_t$ be the number of transmit antennas and $M_r$ be the number of receive antennas. Let H be $M_r \times M_r$, the first channel matrix corresponding the MIMO channel. If X is the data to be transmitted where X is a matrix $M_r \times L$, the data received at the receiving antennas will be $$Y = M_r \times L = \frac{\sqrt{SNR}}{M_t} HX + N \qquad \text{First channel matrix-Equation 1}$$

In Equation 1, SNR represents the instantaneous SNR and N represents the Additive White Gausian Noise (AWGN). The normalization of the SNR with the number of transmit antennas is applied to account for the fact that the expected power received at the each receive antenna is unity. This MIMO channel matrix is then converted to a second channel matrix for each transmission scheme, at 410. For example, the second channel matrix would be different for the Alamouti scheme than the Pure Spatial Multiplexing (PSM) scheme used in space-time coding (STC).

Most of the space-time codes are such that the entries of the codeword matrix are represented as a linear combination of the complex symbols coming from a constellation such as a QAM order. Equation 1 stated above can be rewritten as $$Y = vec(Y) = \qquad \text{Second channel matrix-Equation 2}$$
$$M_r \times L = \frac{\sqrt{SNR}}{M_t} \tilde{H}s + vec(N).$$

The symbol $\tilde{H}$ in Equation 2 represents the second channel matrix of each transmission scheme. Performing a vector operation on each entity of the equation stacks the columns of the first channel matrix into a single column vector. Once the second channel matrix for each transmission scheme of the space-time coding schemes has been computed, a singular value decomposition (SVD) is performed on the second channel matrix to obtain the channel gain for that transmission scheme, at 415. The process of singular value decomposition involves replacing the $\tilde{H}$ matrix of each transmission scheme with a $U\lambda V^H$ matrix where U is a unitary matrix that does not change the second channel matrix when multiplied with it, the $V^H$ is also a unitary matrix that does not change the value of the matrix it is multiplied with and the $\lambda$ is a diagonal matrix that comprises channel gains corresponding to each stream of data sent by the transmitting antennas. The lowest value in the diagonal matrix is the channel gain for the worst hit data stream and therefore the process of optimizing the transmission is done based on the worst hit data stream. The worst hit data stream is the stream that has undergone the most change due to the noise and other interference in the transmission. Even if there is no such data stream that is worst hit, a reasonable approximation can be made.

The singular value decomposition is done to reduce the equation of the second channel matrix to an equivalent SISO SNR equation that can be used to determine the optimum transmission scheme of the space-time coding schemes, at 420.

The process of singular value decomposition changes Equation 2 to:

$$\tilde{y} = \frac{\sqrt{SNR}}{M_t} \lambda \tilde{s} + \tilde{n}. \qquad \text{Singular value decomposition-Equation 3}$$

In Equation 3 the following apply: $\tilde{y}=U^H y$; $\tilde{n}=U^H n$ and $\tilde{s}=V^H s$. The matrix $\lambda$ is the singular value matrix of $\tilde{H}$. Hence, the equivalent SISO SNR can be represented as:

$$\text{Equivalent } SISO\ SNR = SNR \times \frac{\lambda_{min} * \lambda_{min}}{M_t}.$$

The $\lambda_{min}$ value is the channel gain of the worst data stream and hence the link adaptation process is optimized based on this worst hit data stream. Those skilled in the art will appreciate that using data streams other than the worst hit data stream can also be used to optimize the transmission and these modes are within the scope of the present invention.

In an embodiment, the channel gain for each transmission scheme is added to the FEC gain and the modulation order gain to obtain a total channel gain of each transmission scheme, at 425. For example, there may be one FEC scheme that the channel may support, two constellation schemes (e.g., QAM1 and QAM2) and two space-time coding schemes (e.g., Alamouti and PSM). In this case there would be four three tuples that used to determine the best scheme of transmission based on the total channel gains.

Assuming the values in the three tuple represent:

Total gain=(FEC gain,Constellation gain,space-time coding gain)

The total channel gains for the abovementioned example would be:

Total gain 1=(1, QAM1, Alamouti)

Total gain 2=(1, QAM1, PSM)

Total gain 3=(1, QAM2, Alamouti)

Total gain 4=(1, QAM2, PSM)

As shown at 430, the best channel gain can be selected based on conditions applied to the total channel gains such as the amount of throughput required, and/or the amount of error that may be tolerated at the receiving end. Once the best scheme is selected, the next data stream is transmitted based on the transmission scheme that will specify the rate or data transfer, the redundancy required during transmission, etc.

The following is an example that determines the best scheme to transmit data based on the link adaptation algorithm described above. The example considers two transmit antennas and two receive antennas but is not so limited. The example further considers a single rate FEC, two modulation orders and Alamouti and PSM as the space-time coding schemes.

For the Alamouti scheme, the second channel matrix would be:

$$H_{Alam} = \begin{pmatrix} h_{11} & h_{12} \\ h_{12}^* & -h_{11}^* \\ h_{21} & h_{22} \\ h_{22}^* & -h_{21}^* \end{pmatrix}$$

and the minimum singular value is given by $$\lambda_{min,Alam} = \sqrt{|h_{11}|^2 + |h_{12}|^2 + |h_{21}|^2 + |h_{22}|^2}$$

For PSM, the equivalent channel gain is $$H_{PSM} = \begin{bmatrix} h_{11} & h_{12} \\ h_{21} & h_{22} \end{bmatrix}$$

Let the minimum eigenvalue of the $H_{PSM}$ matrix be $\lambda_{min}$. This $\lambda_{min}$ will be less than or equal to $\lambda_{min,\ Alam}$. Consider the signaling with either the Alamouti scheme with QAM1, or with PSM and QAM2. Assuming the transmission rate of QAM1 is twice the rate of QAM2 and the Alamouti and PSM transmission schemes have the same rate, the minimum distance of the Alamouti scheme is given by:

$$\lambda_{min,Alam} * distance_{min}(QAM1)$$

and the distance of PSM transmission is given by:

$$\lambda_{min,Alam} * distance_{min}(QAM2)$$

The link adaptation algorithm chooses the Alamouti scheme with QAM1 if $$\lambda_{min,Alam} * distance_{min}(QAM1) > \lambda_{min,Alam} * distance_{min}(QAM2)$$

else the PSM with QAM2 is picked.

Figure 5:
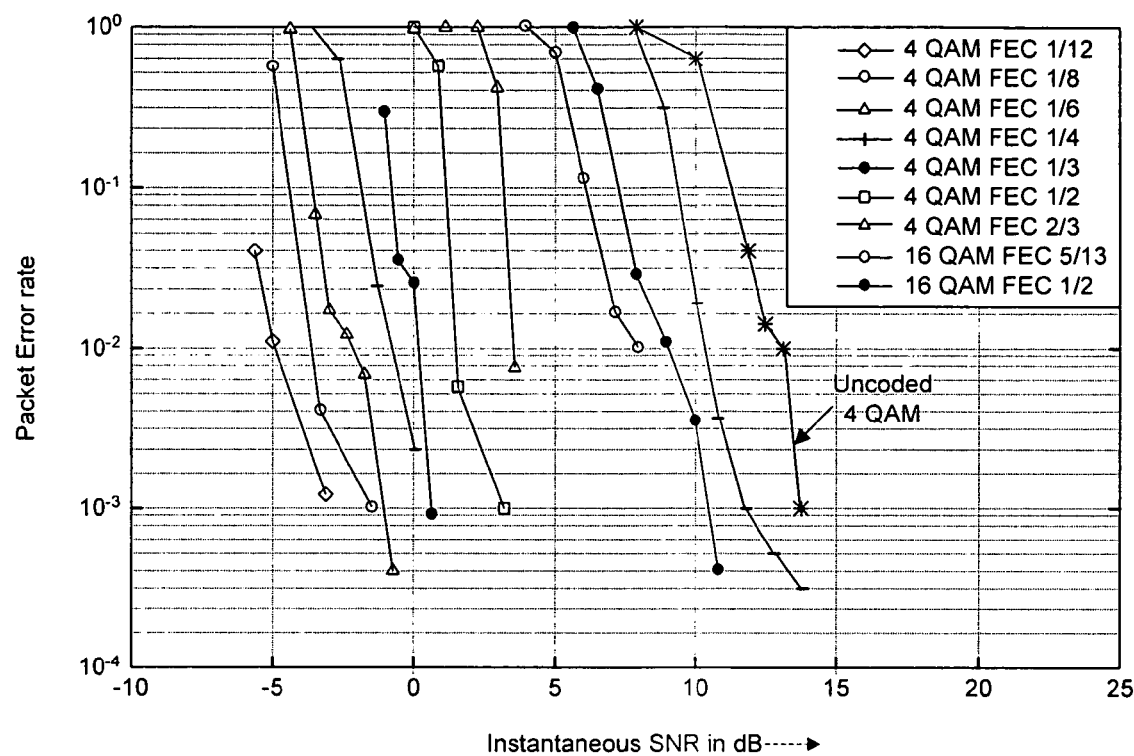
FIG. 5 shows an example plot of forward error correction versus the modulation order, under an embodiment.

FIG. 5 is a plot showing simulation results between the instantaneous SNR and the packet error rate for each transmission scheme, under an embodiment. In one embodiment, the channel gain obtained from the space-time coding scheme is plotted and used as a reference point to determine the FEC gain and QAM gain. In another embodiment, the signal lines closest to the reference point are taken based on predetermined conditions. The conditions include, for example, the packet error rate required could be the one closest to $10^{-2}$ and hence the signal line that meets this criteria is chosen and the corresponding FEC gain and the QAM gain is calculated using the chart provided in the simulation.

Once the FEC gain, the QAM gain and the space-time coding gain has been computed, the total channel gain is calculated. As per one embodiment, this can be a sum of the channel gains. The best scheme is picked based on the total channel gains computed. In one embodiment, the required throughput can also be a criterion for choosing a particular transmission scheme.

What is claimed is:

1. A method of a transmitter optimizing transmission of a plurality of data streams on a multiple-input multiple-output channel, the method comprising:
   reducing the multiple-input multiple-output channel for each transmission scheme to an equivalent single-input single-output channel for the transmission scheme, comprising;
   obtaining a first channel matrix of the multiple-input-multiple-output transmission channel;
   converting the first channel matrix to an equivalent second channel matrix for each transmission scheme, the multiple-input-multiple-output transmission channel using a plurality of transmission schemes,
   performing a singular value decomposition on the second channel matrix of each transmission scheme to obtain a channel gain of each transmission scheme using a predetermined procedure;
   calculating a total channel gain of each transmission scheme to obtain the equivalent single-input single-output channel for the transmission scheme; and
   repeating steps (a) to (d) on the plurality of transmission schemes to obtain a plurality of total channel gains,
   wherein a first channel gain for each transmission scheme is computed as a product of a minimum value of the first channel gain for each transmission scheme and a signal-to-noise ratio: and wherein the data stream that has been affected most in the multiple-input multiple-output channel corresponds to the minimum value; and
   the transmitter transmitting the plurality of data streams based on the single-input single-output channel for the transmission scheme.

2. The method of claim 1, wherein the transmitting further comprises selecting a best transmission scheme based on a predetermined condition applied to the plurality of total channel gains.

3. The method of claim 2, wherein the selecting further comprises choosing the best transmission scheme based on a highest value of the equivalent single-input single-output channel for the transmission scheme.

4. The method of claim 1, wherein the performing a singular value decomposition further comprises substituting the second channel matrix with a product of a first unitary matrix corresponding to the second channel matrix of each transmission scheme, a diagonal matrix representing the channel gains of the transmission scheme and a second unitary matrix corresponding to the second channel matrix of each transmission scheme.

5. The method of claim 1, wherein the data stream that has been affected most in the multiple-input multiple-output channel corresponds to the minimum value.

6. A method of a transmitter optimizing transmission of a plurality of data streams on a multiple-input multiple-output channel, the method comprising:
   reducing the multiple-input multiple-output channel for each transmission scheme to an equivalent single-input single-output channel for the transmission scheme, comprising;
   obtaining a first channel matrix of the multiple-input-multiple-output transmission channel;
   converting the first channel matrix to an equivalent second channel matrix for each transmission scheme, the multiple-input-multiple-output transmission channel using a plurality of transmission schemes,
   performing a singular value decomposition on the second channel matrix of each transmission scheme to obtain a channel gain of each transmission scheme using a predetermined procedure;
   calculating a total channel gain of each transmission scheme to obtain the equivalent single-input single-output channel for the transmission scheme; and
   repeating steps (a) to (d) on the plurality of transmission schemes to obtain a plurality of total channel gains,
   wherein the calculating a total channel gain of each transmission scheme further comprises adding the channel gain of the transmission scheme, a forward error correction gain of the transmission scheme and a modulation order gain of the transmission scheme;
   the transmitter transmitting the plurality of data streams based on the single-input single-output channel for the transmission scheme.

7. The method of claim 1, wherein the transmitting end has at least two transmit antennas.

8. The method of claim 1, wherein the receiving end has at least one receive antenna.

9. The method of claim 1, wherein the link adaptation is optimized based on at least one of a throughput required, packet error correction rate, or both.

10. The method of claim 1, wherein the link adaptation is optimized for a forward error correction gain, a modulation order gain and a space-time coding gain.

11. A system comprising a link adaptation unit coupled to a processor, the processor configured to reduce a multiple-input multiple-output channel for each transmission scheme to an equivalent single-input single-output channel for the transmission scheme and configured to control transmission of a plurality of data streams over the multiple-input multiple-output channel based on the single-input single-output channel for the transmission scheme, wherein the transmission is optimized, wherein the processor is configured to:

obtain a first channel matrix of the multiple-input-multiple-output transmission channel;

convert the first channel matrix to an equivalent second channel matrix for each transmission scheme, the multiple-input-multiple-output transmission channel using a plurality of transmission schemes, perform a singular value decomposition on the second channel matrix of each transmission scheme to obtain a channel gain of each transmission scheme using a predetermined procedure;

calculate a total channel gain of each transmission scheme to obtain the equivalent single-input single-output channel for the transmission scheme; and repeat steps (a) to (d) on the plurality of transmission schemes to obtain a plurality of total channel gains;

wherein the first channel gain for each transmission scheme is computed as a product of a minimum value of the first channel gain for each transmission scheme and a signal-to-noise ratio.

12. The system of claim 11, wherein the link adaptation unit is configured to select a best transmission scheme based on a predetermined condition applied to the plurality of total channel gains.

13. The method of claim 12, wherein the best transmission scheme is chosen based on a highest value of the equivalent single-input single-output channel for the transmission scheme.

14. The system of claim 11, wherein the processor is configured to substitute the second channel matrix with a product of a first unitary matrix corresponding to the second channel matrix of each transmission scheme, a diagonal matrix representing the channel gains of the transmission scheme and a second unitary matrix corresponding to the second channel matrix of each transmission scheme.

15. The system of claim 11, wherein the data stream that has been affected most in the multiple-input multiple-output channel is the minimum value.

16. The system of claim 11, wherein the processor is configured to add one or more of the channel gain of the transmission scheme, a forward error correction gain of the transmission scheme and a modulation order gain of the transmission scheme to obtain the total channel of the transmission scheme.

17. The system of claim 11, further comprising at least two transmit antennas coupled to the link adaptation unit.

18. The system of claim 11, further comprising at least one receive antenna coupled to the link adaptation unit.

19. The system of claim 11, wherein the link adaptation is optimized based on one or more of a forward error correction gain, a modulation order gain and a space-time coding gain.

\* \* \* \* \*